US012728666B2

(12) United States Patent
Rizk et al.

(10) Patent No.: US 12,728,666 B2
(45) Date of Patent: Sep. 8, 2026

(54) HANDLE

(71) Applicant: 1000245527 ONTARIO INC., Mississauga (CA)

(72) Inventors: Mark-Pierre Rizk, Mississauga (CA); Yves E. Rizk, Mississauga (CA); Freddy Guirguis, Mississauga (CA); Sham Sharma, Saint John (CA)

(73) Assignee: 1000245527 ONTARIO INC., Mississauga (CA)

( * ) Notice: Subject to any disclaimer, the term of this patent is extended or adjusted under 35 U.S.C. 154(b) by 1083 days.

(21) Appl. No.: 17/814,343

(22) Filed: Jul. 22, 2022

(65) Prior Publication Data

US 2024/0025205 A1 Jan. 25, 2024

(51) Int. Cl.
*B44D 3/14* (2006.01)

(52) U.S. Cl.
CPC .................................... *B44D 3/14* (2013.01)

(58) Field of Classification Search
CPC .................................. B44D 3/14; B44D 3/123
See application file for complete search history.

(56) References Cited

U.S. PATENT DOCUMENTS

| | | | | | |
|---|---|---|---|---|---|
| 2,786,707 | A * | 3/1957 | Campbell | A47G 21/145 | |
| | | | | 220/759 | |
| 3,189,937 | A * | 6/1965 | Sciortino | A47G 23/0266 | |
| | | | | D7/622 | |
| 3,261,635 | A * | 7/1966 | Talay | A47G 23/0266 | |
| | | | | 215/396 | |
| 4,993,675 | A * | 2/1991 | Walker | A47G 23/0266 | |
| | | | | 220/759 | |
| 6,135,310 | A * | 10/2000 | Svehaug | B44D 3/123 | |
| | | | | 220/756 | |
| D456,578 | S * | 4/2002 | Smith | D7/622 | |
| D595,133 | S * | 6/2009 | Lewis | D7/622 | |
| D605,937 | S * | 12/2009 | Lovelace, Jr. | D9/434 | |
| 9,796,507 | B2 * | 10/2017 | Wangler | B44D 3/14 | |
| 9,919,843 | B2 * | 3/2018 | Pulst | A47G 23/0241 | |
| 10,124,624 | B2 * | 11/2018 | Gringer | B65D 25/2829 | |

* cited by examiner

*Primary Examiner* — Stephen A Vu
(74) *Attorney, Agent, or Firm* — DLA Piper LLP (US)

(57) ABSTRACT

An example of an apparatus to allow a user to support a can is provided. The apparatus includes an elongated body to engage with a hand of a user. In addition, the apparatus includes a connection mechanism disposed on a first end of the elongated body. The connection mechanism is to engage a rim of a can. Furthermore, the apparatus includes a base disposed on a second end of the elongated body. The base is to apply a force against a side of the can.

18 Claims, 12 Drawing Sheets

HANDLE

BACKGROUND

Painters often apply paint to a surface from a container. For example, a painter may fill a paintbrush by dipping the brush into a paint can, such as a standard gallon can of paint. This allows the painter to move along a surface while carrying the can of paint to provide convenient filling of the paint brush.

Paint cans generally have a wire handle forming a substantially semicircular arc connected to the can of paint at opposite sides on the sidewall. The wire handle is rotatable about the connection points at both ends and therefore can move from an upright position when the wire handle is used to support the weight of the can of paint to a lowered position when the wire handle is not in use. While the wire handle is sufficient to support the weight of the can of paint, the wire handle is not particularly comfortable for the user to hold while painting and filling the pain brush.

SUMMARY

In accordance with an aspect of the invention, there is provided an apparatus. The apparatus includes an elongated body to engage with a hand of a user. In addition, the apparatus includes a connection mechanism disposed on a first end of the elongated body. The connection mechanism is to engage a rim of a can. Furthermore, the apparatus includes a base disposed on a second end of the elongated body. The base is to apply a force against a side of the can.

In accordance with an aspect of the invention, there is provided a method. The method involves engaging a rim of a can with a connection mechanism disposed on a first end of an elongated body. In addition, the method involves applying a force against a side of the can with a base. The base is disposed at a second end of the elongated body. The connection mechanism and the base secure the elongated body to the can.

BRIEF DESCRIPTION OF THE DRAWINGS

Reference will now be made, by way of example only, to the accompanying drawings in which.

DETAILED DESCRIPTION

As used herein, any usage of terms that suggest an absolute orientation (e.g. "front", "back", "top", "bottom", "up", "down", "left", "right", "low", "high", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Painting surfaces with a paint brush is generally carried out by filling the paint brush with paint followed by an application of the paint to a surface. In many cases, the paint brush is filled using paint directly from a paint can, such as a gallon can. Accordingly, the paint can may be carried by a user to facilitate filling of the paint brush as the user moves from one surface or portion of a surface to be painted to another. While the wire handles typically found on paint cans will support the weight of the paint can, the wire handles are not comfortable for extended use to hold the paint can. In addition, while the wire handle is used to hold the paint can, the wire handle interferes with the filling process of the paint brush.

An apparatus is provided to support a can of paint or other liquid to be applied by loading the liquid into a brush for application on a surface. Although the following description provides examples of a painting application, it is to be appreciated by a person of skill with the benefit of this description that other applications are contemplated. In particular, the apparatus may be used for the application of any liquid stored in a can to be applies to a surface with a brush, such as stains, coatings, adhesives, etc. The apparatus provides an ergonomic handle on the side of the paint can to allow a user to support the paint can in a comfortable manner. In addition, since the handle is disposed substantially on the side of the paint can, the handle does not interfere with the filling process of the brush.

Figure 1:
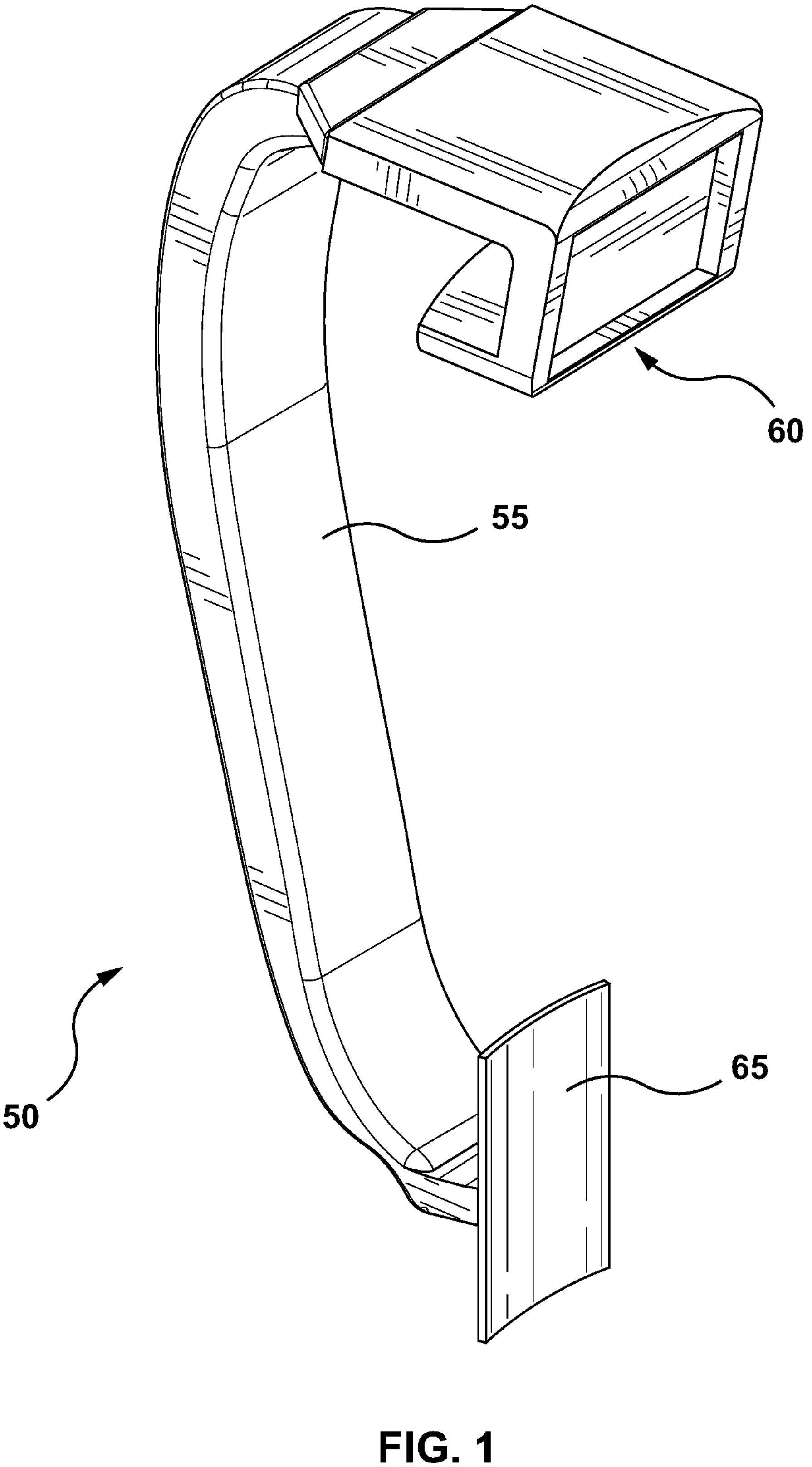
FIG. 1 is a perspective view of an example of an apparatus to allow a user to support a can.

Referring to FIG. 1, a representation of an apparatus 50 to allow a user to support a can is generally shown. It is to be appreciated by a person of skill with the benefit of this description that the apparatus 50 may include additional features and components. For example, the apparatus 50 may also be varied in size to accommodate different types of cans as well as different hand sizes. In addition, some of the components described below may be omitted or varied in variations of the apparatus 50. In the present example, the apparatus 50 includes an elongated body 55, a connection mechanism 60, and a base 65.

In the present example, the elongated body 55 is to engage with the hand of a user. The manner by which the hand of the user engages with the elongated body is not particularly limited. For example, the elongated body 55 may be used as a handle which is gripped by the user. In other examples, the elongated body 55 may support or hold the hand of a user against a side of a can.

The material from which the elongated body 55 is constructed is not particularly limited. In the present example, the elongated body 55 is made from a lightweight material, such as a plastic (e.g. acrylic, polymethyl methacrylate, polycarbonate, polyethylene, polypropylene, polyethylene terephthalate, polyvinyl chloride, or acrylonitrile-butadiene-styrene), fiberglass, or other composite materials having sufficient mechanical strength to store the substance in a durable and rigid manner. By using plastics, the elongated body 55 may be made from various processes such as injection molding techniques or three-dimensional printing. In other examples. The elongated body 55 may also be solid or hollow in other examples to reduce weight provided that it has sufficient mechanical rigidity to support. In other examples, the elongated body 55 may also be made from other materials such as wood or a metal, such as steel, bronze, other alloys.

The dimensions of the elongated body 55 are not particularly limited and may be varied depending on the application and to accommodate different sizes of cans and hands. In the present example, the elongated body 55 is has a substantially rectangular cross section of about 6 mm by 30 mm and is about 150 mm long. In other examples, the elongated body 55 may have different dimensions to accommodate different hand sizes. It is to be appreciated by a person of skill with the benefit of this description that the elongated body 55 may have other form factors. For example, the elongated body 55 may have a different cross section, such as a circular cross section or an irregular shape, such as an ergonomic shape.

The connection mechanism 60 is disposed at the top end of the elongated body 55. In the present example, the connection mechanism 60 is to engage the rim of a can to secure the apparatus 50 to the side of the can. The manner by which the connection mechanism 60 engages the rim is not particularly limited. In the present example, the connection mechanism 60 is dimensioned to be secured against the rim via a friction fit. In particular, the connection mechanism 60 may be placed over the rim and then pushed in an outward direction from the center of the can such that the lower portion of the connection mechanism 60 engages the underside of the rim to form a friction fit. It is to be appreciated by a person of skill with the benefit of this description that variations of the connection mechanism 60 are contemplated. For example, the connection mechanism 60 may involve a fastener or additional mechanical features. In another example, the connection mechanism 60 may include a magnetic coupling to the rim.

The material or materials from which the connection mechanism 60 is constructed is not particularly limited. In the present example, the connection mechanism 60 is made from the same material as the elongated body 55. Furthermore, the connection mechanism 60 may be formed as part of the same unitary body as the elongated body 55. In other examples, the connection mechanism 60 may also be made from other materials and subsequently attached at the end of the elongated body 55.

The base 65 is disposed at the bottom end of the elongated body 55. In the present example, the base 65 is used to apply a force to the side of a can. By applying a force to the can, the base 65 in combination with the connection mechanism 60 secures the apparatus 50 to the can such that the apparatus 50 can be used to support the weight of the can. In addition, by applying a force against the can, the base 65 helps to secure the connection mechanism 60 to the rim.

The manner by which the base 65 applies the force against the can is not particularly limited. For example, the elongated body 55, the connection mechanism 60, and the base 65 may be formed as a unitary body such that once the connection mechanism 60 engages the rim, the dimensions of the unitary body are such that the base 65 is urged against the side of the can. In such an example, the elongated body 55 may be made of a resiliently flexible material, such as a plastic, that can be deformed when engaged to the can. The deformation may the apply pressure at both the connection mechanism 60 and the base 65 due to the resilient nature of the material. In other examples, biasing elements, such as springs, may be installed to apply a force against the can to secure the apparatus 50 to the can.

It is to be appreciated by a person of skill with the benefit of this description that the apparatus 50 provides a convenient handle that is ergonomic and comfortable for a user. The apparatus 50 allows the user to hold a can of paint while painting to allow the user to continually fill a brush as he moves from one portion of a surface to another. The apparatus 50 also does not block or interfere with the opening of the can to allow for easy access of the brush while the can is being held.

In use, the apparatus 50 may be engaged to a can via the connection mechanism 60 at the rim of the can. By inserting the rim edge into the connection mechanism 60, the base 65 may be pressed against the side of the can to apply a force to secure the elongated body 55 to the can. Once the apparatus 50 is secured, a user can lift the can using the elongated body 55. After the can has been depleted, the apparatus 50 may then be removed and used on another can. The manner by which the apparatus 50 is removed is not limited. In the present example, the apparatus may be removed by disengaging the connection mechanism from the rim. In particular, a force may be applied at the top of the apparatus 50 to urge the connection mechanism 60 toward to the center of the can.

Figure 2:
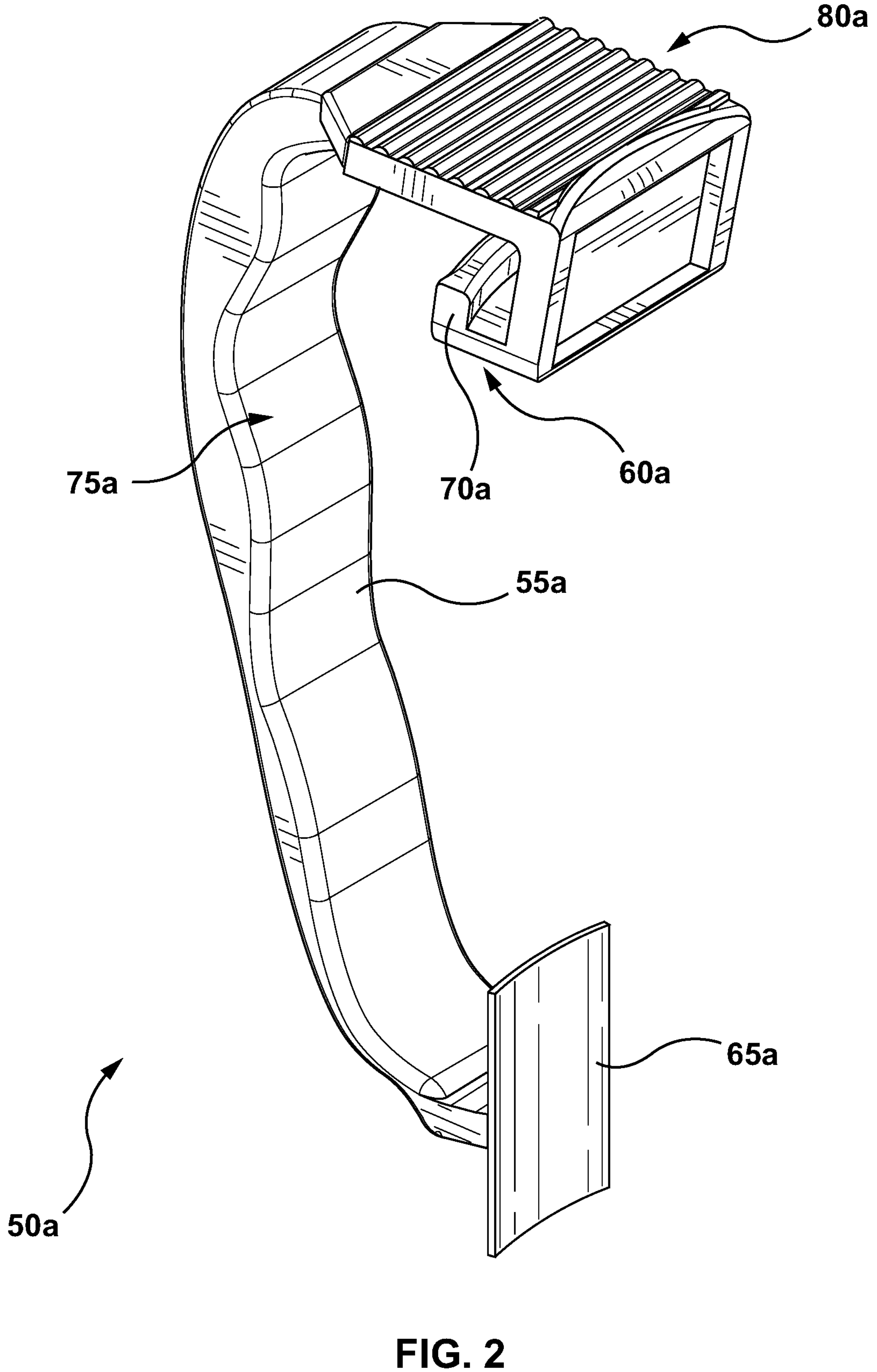
FIG. 2 is a perspective view of another example of an apparatus to allow a user to support a can.
Figure 3:
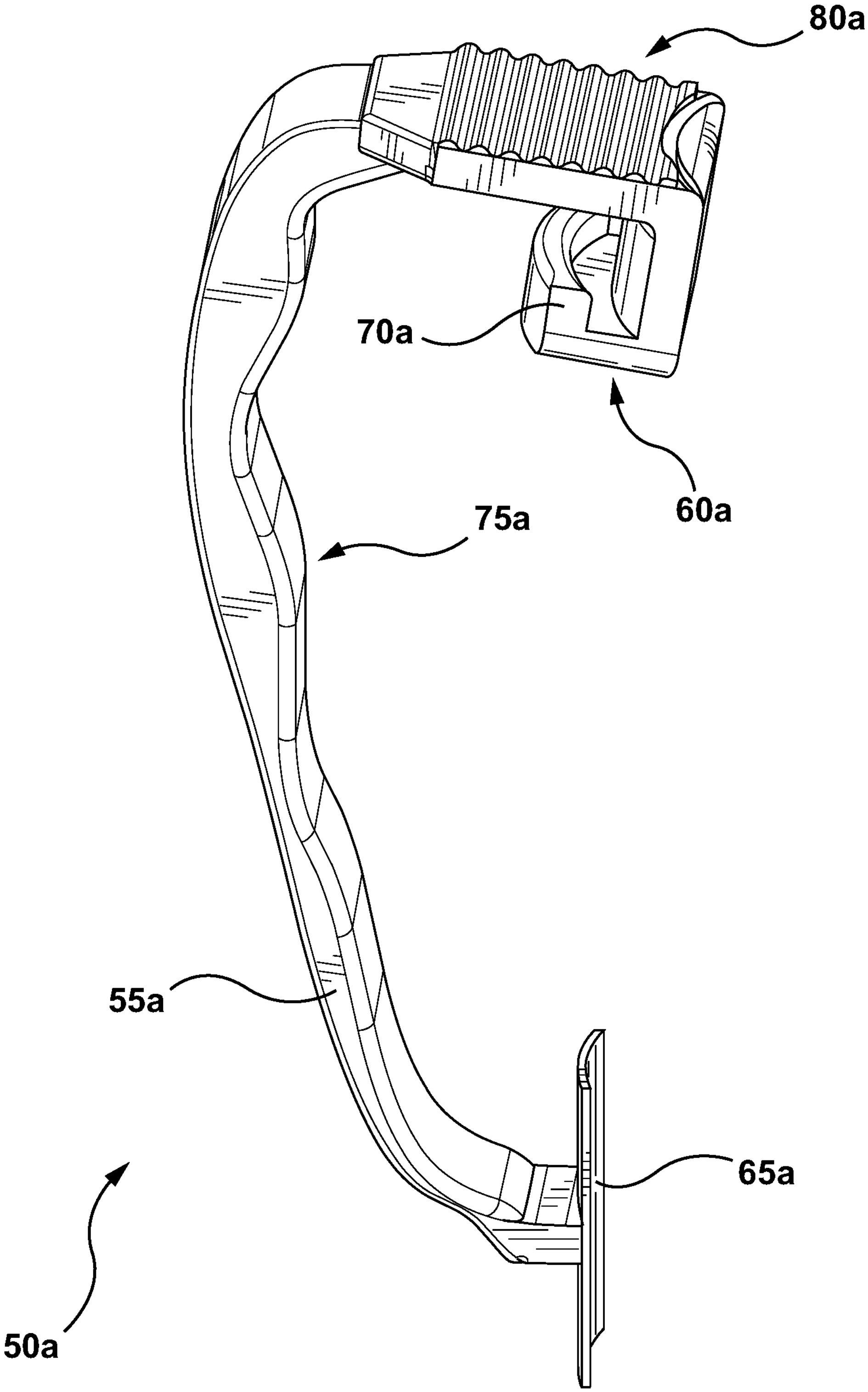
FIG. 3 is a perspective view from another angle of the example of an apparatus shown in FIG. 2 to allow a user to support a can.
Figure 4:
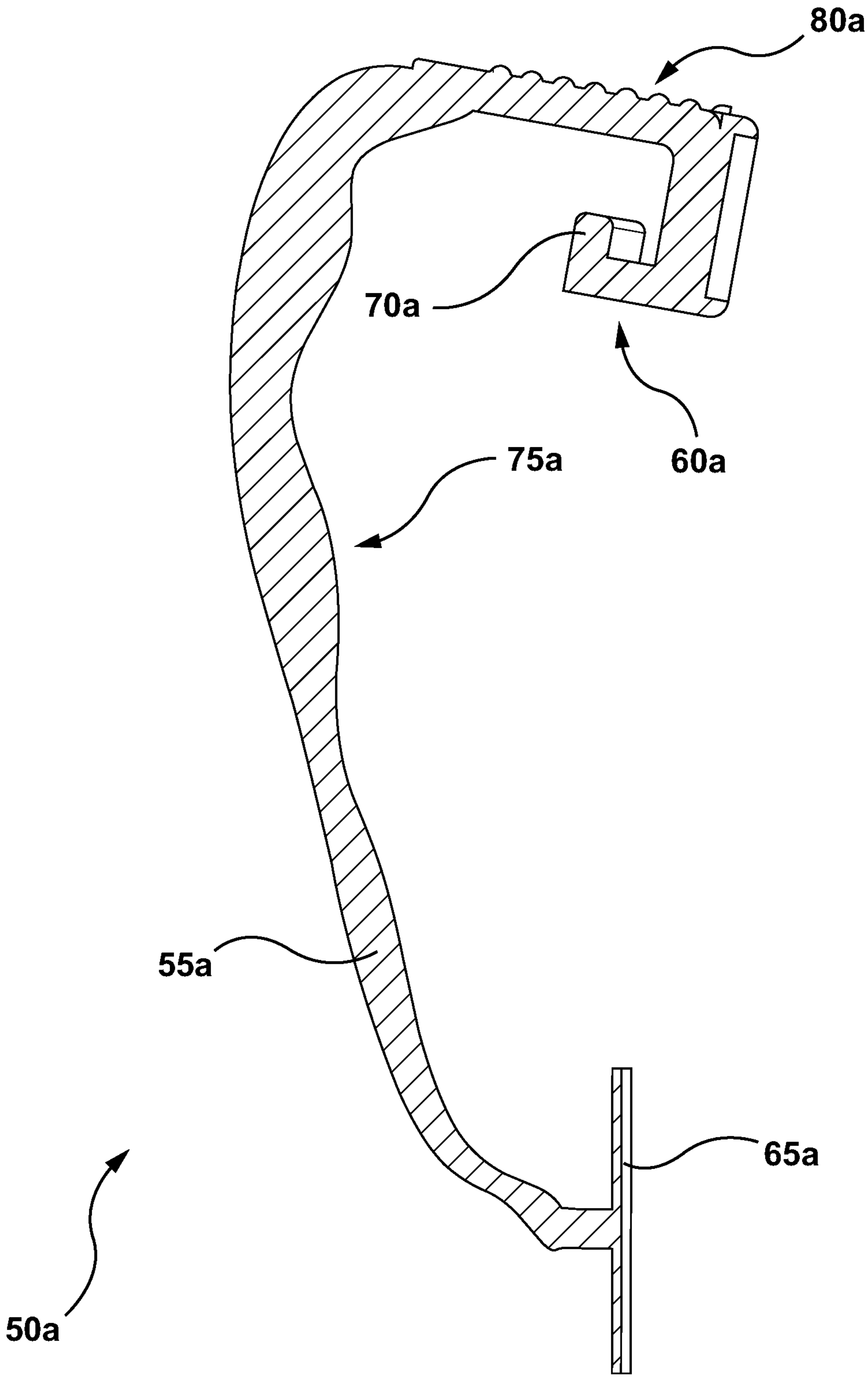
FIG. 4 is a cross sectional view the example of the apparatus shown in FIG. 2.

Referring to FIGS. 2 to 4, representations of another apparatus 50*a* to allow a user to support a can are generally shown. FIGS. 2 and 3 show perspective views of the apparatus 50*a* from different angles. FIG. 4 shows a cross sectional view of the apparatus 50*a*. Like components of the apparatus 50*a* bear like reference to their counterparts in the apparatus 50, except followed by the suffix "a". It is to be appreciated by a person of skill with the benefit of this description that variations of the apparatus 50*a* may include additional features and components and that other variations may omit one or more of the features. In the present example, the apparatus 50*a* includes an elongated body 55*a*, a connection mechanism 60*a*, a base 65*a*, and a textured area 80*a*.

In the present example, the elongated body 55*a* includes a grip 75*a* to facilitate engagement with a hand of the user. The grip 75*a* is not particularly limited and may include any feature disposed on the elongated body 55*a* to improve the comfort and capability of the hand of a user to hold the elongated body 55*a*. In the present example, the grip 75*a* may include contours to receive the fingers of a hand as it grips the elongated body 55*a*. In other examples, the grip 75*a* may also include a coating, such as rubber, silicone or foam, that increases the coefficient of friction between a hand and the elongated body 55*a* to reduce slippage.

The connection mechanism 60*a* include a lip 70*a*. In the present example, the lip 70*a* is to mate with a trough located on the underside of the rim of a can. The manner by which the lip 70*a* mates with the trough is not limited and may involve manually guiding the lip 70*a* into the trough. For example, as the connection mechanism 60*a* engages the rim, an upward force may be applied to the connection mechanism 60*a* from under the rim. The lip 70*a* may be dimensioned to be substantially similar in width as the trough under the rim such that it forms a tight fit when engaged. The fit provides a secure anchor for the connection mechanism 60*a*. It is to be appreciated by a person of skill with the benefit of this description that the lip 70*a* may also be curved to match the curvature of the rim of the can. By matching the curvature, the lip 70*a* may be dimensioned to fit more tightly into the trough to provide a more secure fit.

The textured area 80*a* disposed proximate to the top of the elongated body 55*a* or on top of the connection mechanism 60*a* is to provide additional traction. In some examples, the user may rest a thumb on top of the elongated member during use and the textured area 80*a* may provide additional grip when trying to manipulate the can. In addition, the textured area 80*a* may be used during the installation or removal process of the apparatus 50*a* onto the can.

Figure 5:
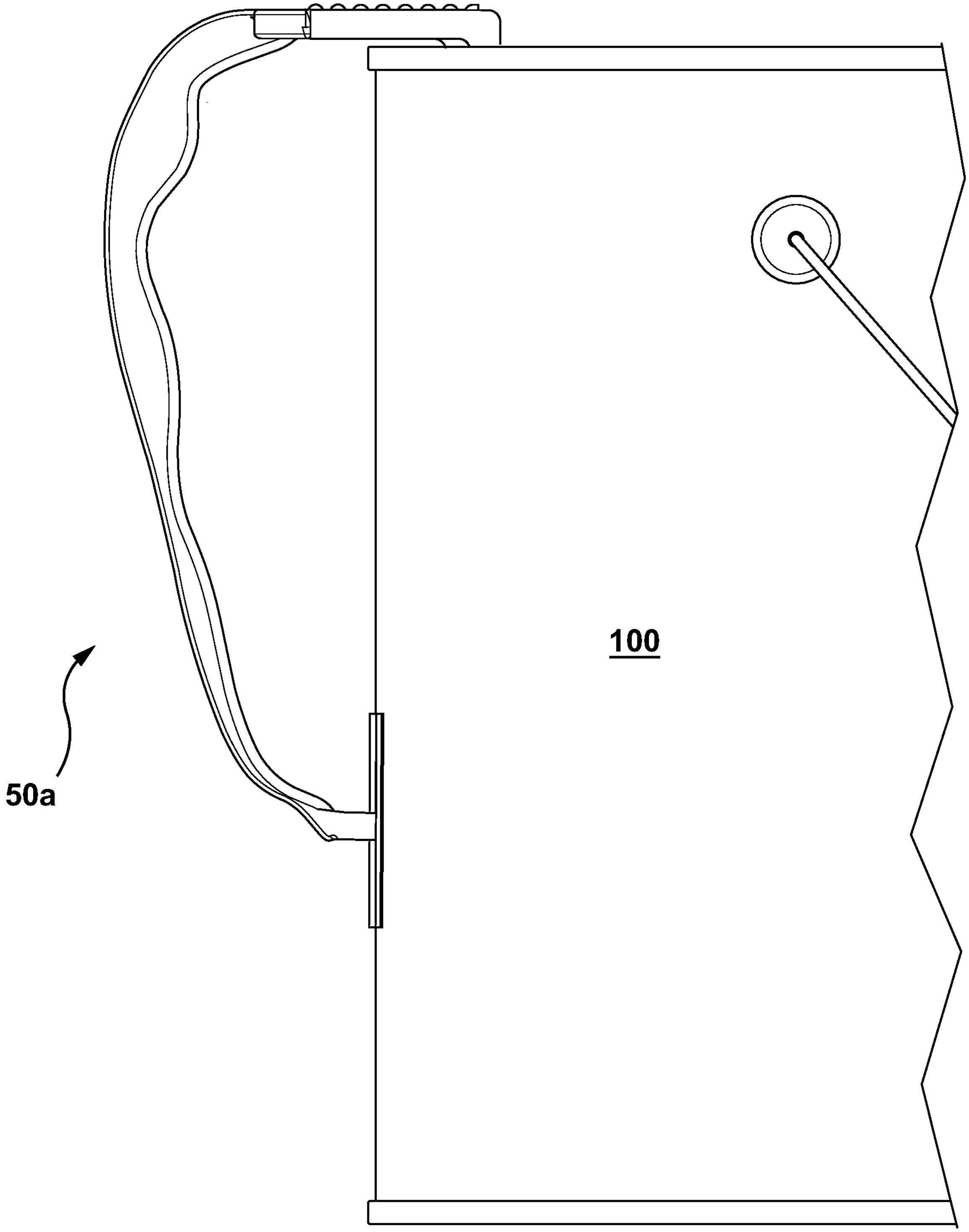
FIG. 5 is a side view of the example of an apparatus shown in FIG. 2 installed on a can to allow a user to support a can.
Figure 6:
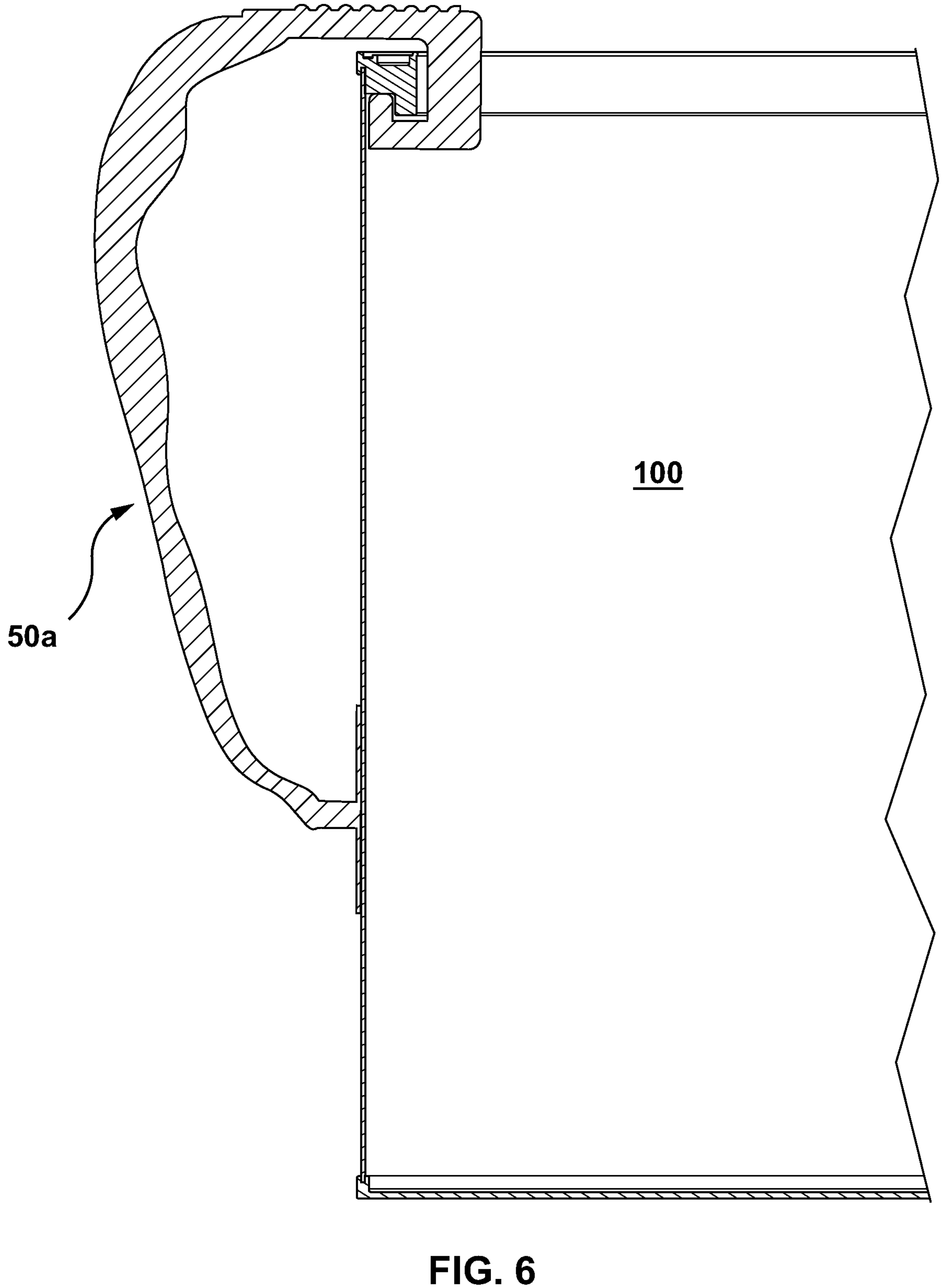
FIG. 6 is a cross sectional view the example of the apparatus and the can shown in FIG. 5.
Figure 7:
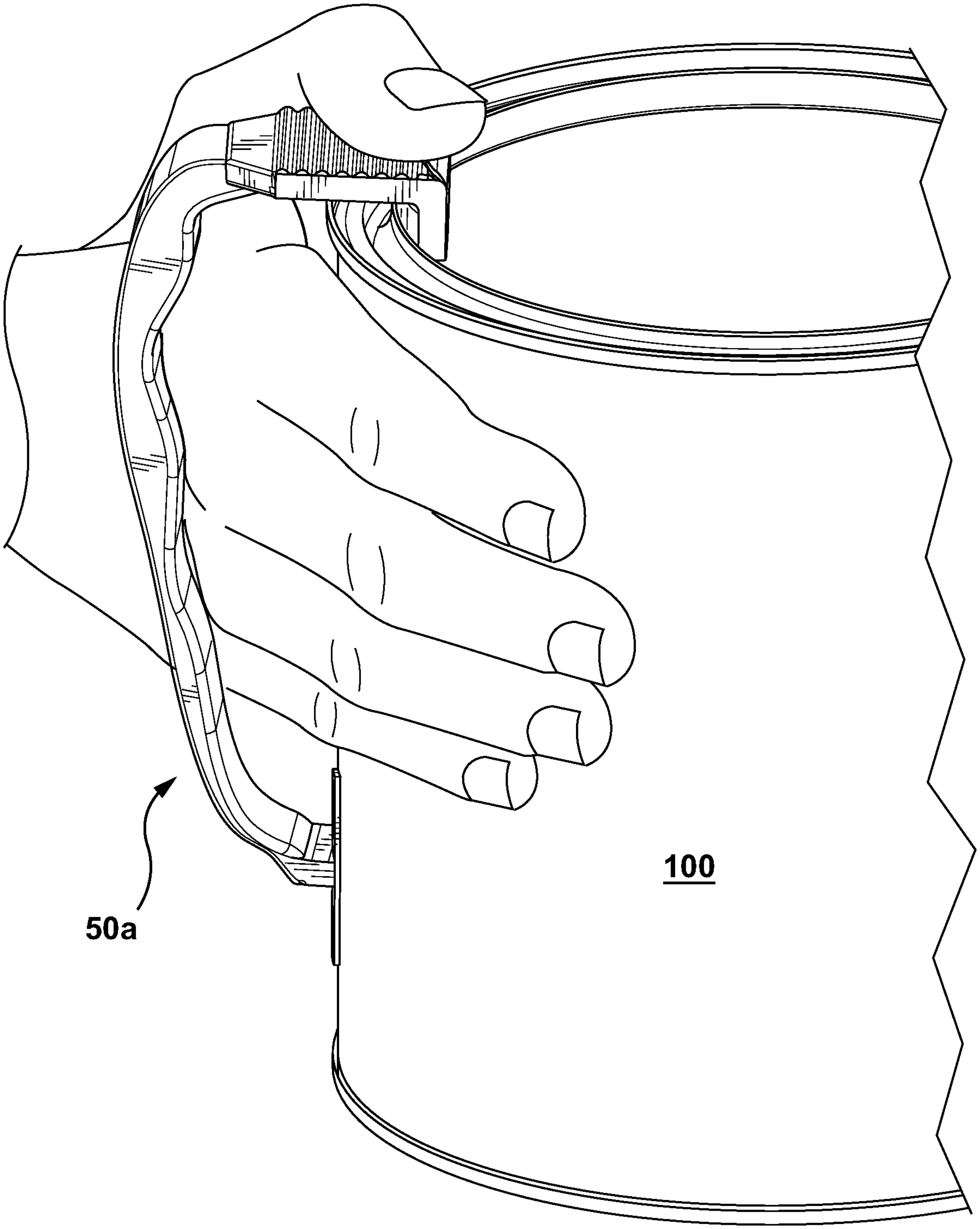
FIG. 7 is a view of the example of an apparatus shown in FIG. 2 installed on a can and in use by a user with a hand in a first position.
Figure 8:
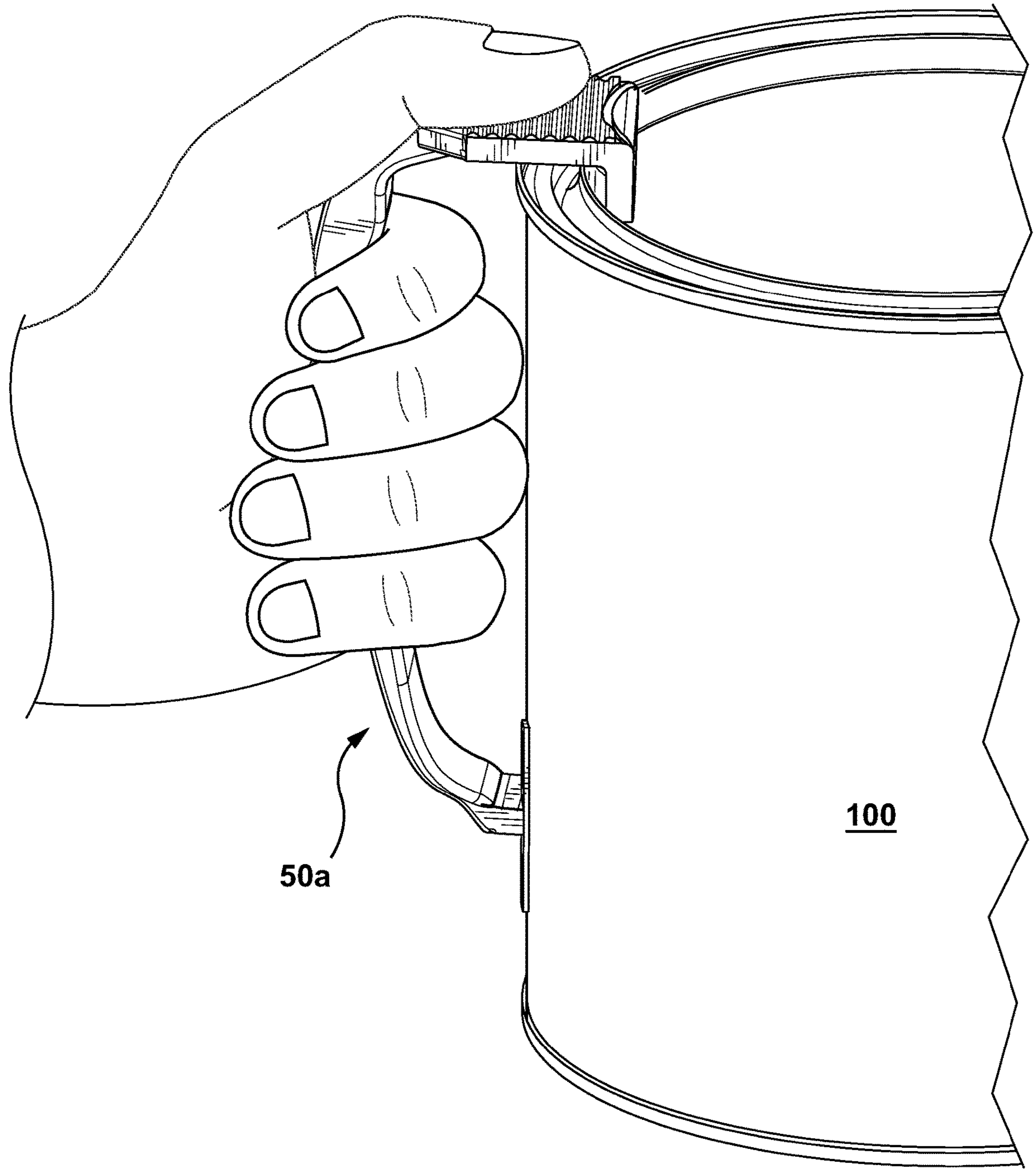
FIG. 8 is a view of the example of an apparatus shown in FIG. 2 installed on a can and in use by a user with a hand in a second position.

Referring to FIG. 5, the apparatus 50*a* is shown attached to a can 100. The apparatus 50*a* may be used to provide a handle for a user to hold while carrying the can to paint a surface with a brush. FIG. 6 shows a cross section view of the apparatus 50*a* attached to the can 100. As illustrated, the lip 70*a* of the apparatus 50*a* engages a trough on the underside of the rim of the can 100. The base 65*a* applies a force to the side of the can 100 due to the resilient nature of the elongated body 55*a* to securely hold the apparatus 50*a* on the side of the can 100 to allow a user to carry the can 100 and its contents by the elongated body 55*a*. The manner by which a user carries the can 100 is not particularly limited and may be varied based on personal preference. Since the apparatus 50*a* is secured tightly to the can 100, the elongated body 55*a* may be used to secure a hand against the can such as shown in FIG. 7. Alternatively, the apparatus 50*a* may also be used as a handle where the hand of a user may hold the elongated body 55*a* as shown in FIG. 8.

Figure 9:
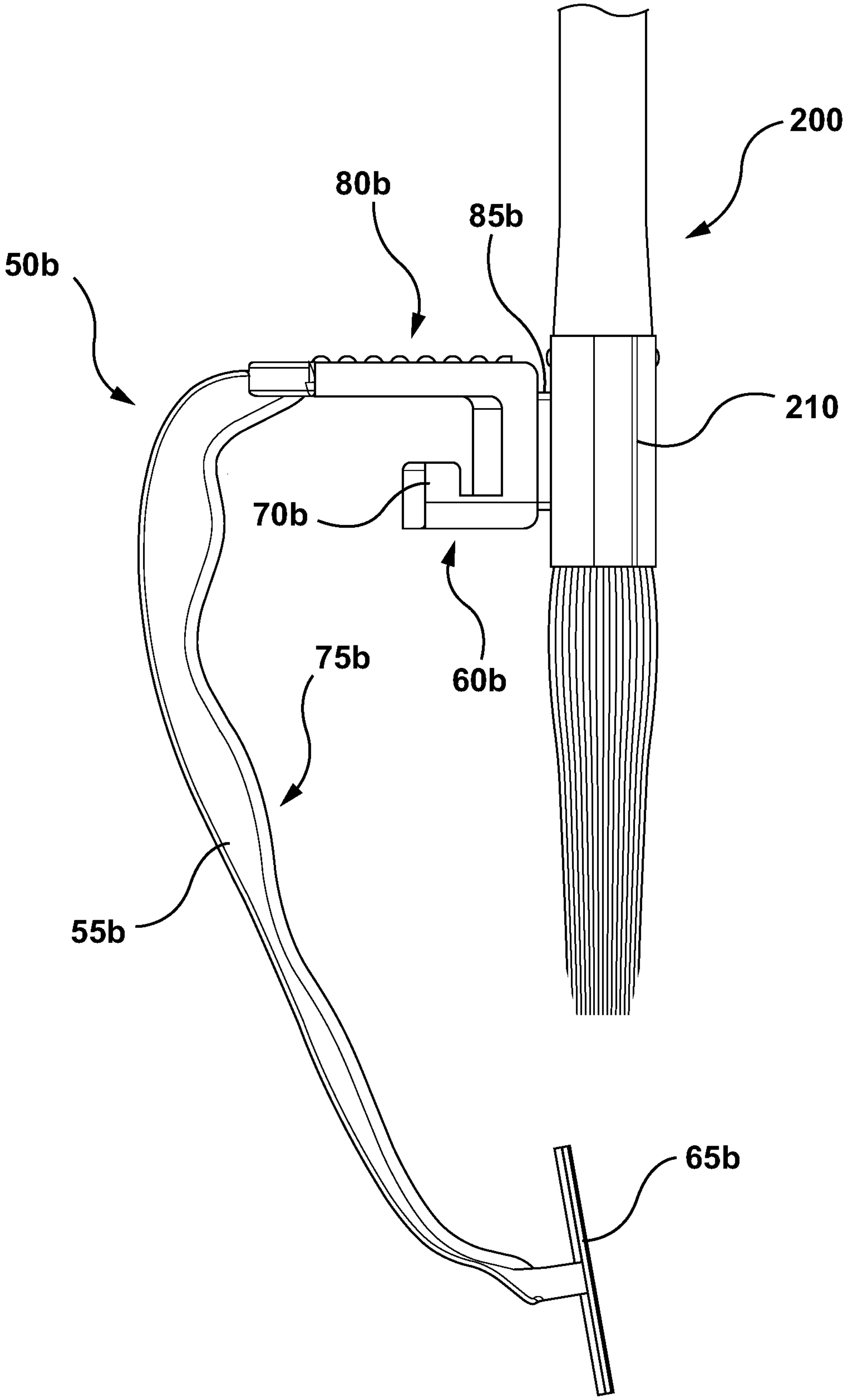
FIG. 9 is a side view of another example of an apparatus with a brush attachment to allow a user to support a can.

Referring to FIG. 9, a representation of another apparatus 50*b* to allow a user to support a can are generally shown. Like components of the apparatus 50*b* bear like reference to their counterparts in the apparatus 50*a*, except followed by the suffix “b”. It is to be appreciated by a person of skill with the benefit of this description that variations of the apparatus 50*b* may include additional features and components and that other variations may omit one or more of the features. In the present example, the apparatus 50*b* includes an elongated body 55*b* with a grip 75*b*, a connection mechanism 60*b* with a lip 70*b*, a base 65*b*, a textured area 80*b*, and a brush attachment 85*b*.

In the present example, the brush attachment 85*b* is to hold a paint brush 200 when not in use. The manner by which the brush attachment 85*b* holds the paint brush 200 is not particularly limited. In the present example, the brush attachment 85*b* may be a magnet disposed on a forward face of the connection mechanism 60*b*. Since most paint brushes include a metallic band 210 that is often ferromagnetic material, the brush attachment 85*b* may magnetically couple to the metallic band 210.

Accordingly, a user of the paint brush 200 may quickly attach and detach the paint brush 200 during use. It is to be appreciated by a person of skill with the benefit of this description that while the apparatus is in use and attached to a can, the brush attachment 85*b* will hold the paint brush 200 above the can such that any excess paint or other liquid that may drip from the brush will drip into the can.

Figure 10:
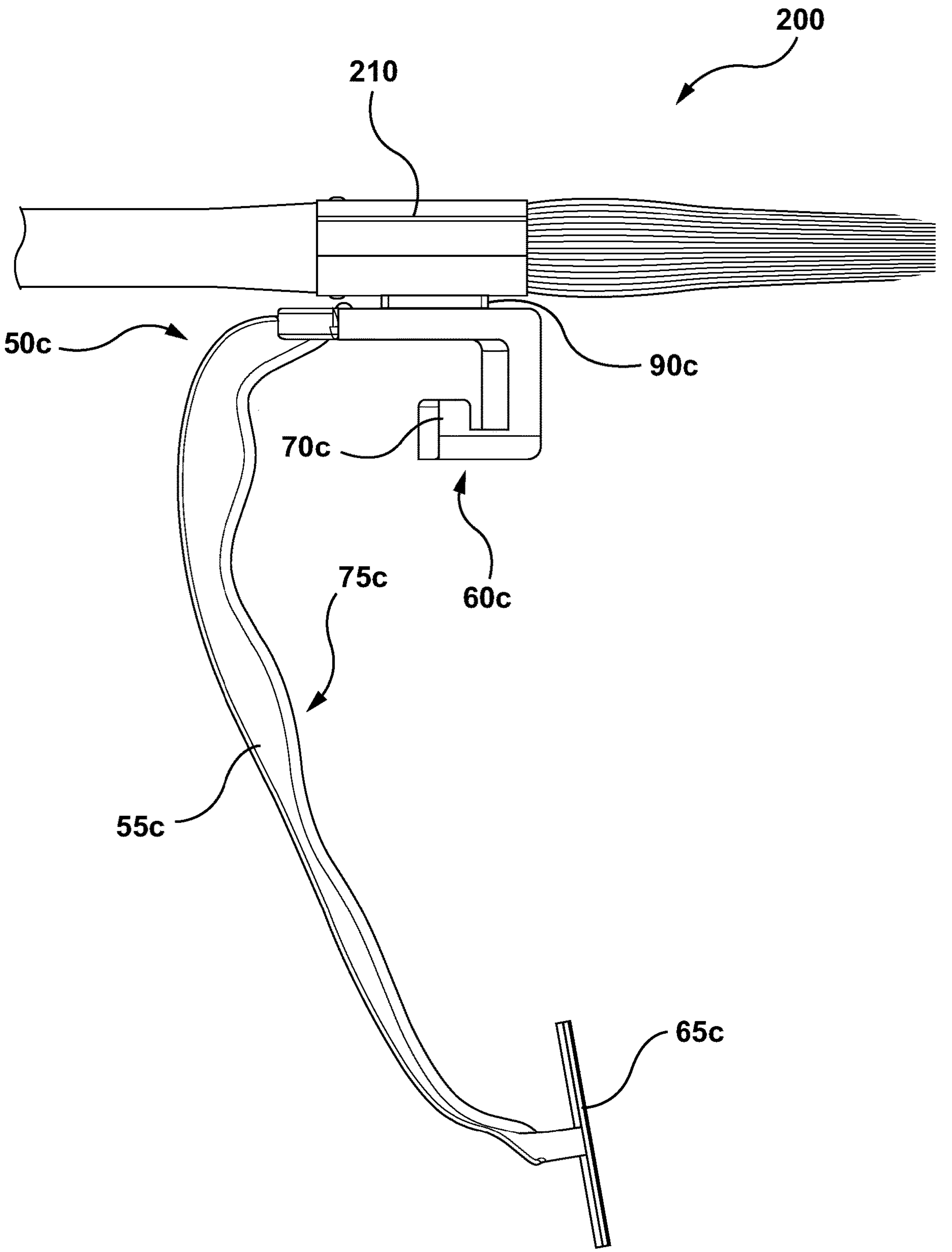
FIG. 10 is a side view of another example of an apparatus with another brush attachment to allow a user to support a can.

Referring to FIG. 10, a representation of another apparatus 50*c* to allow a user to support a can are generally shown. Like components of the apparatus 50*c* bear like reference to their counterparts in the apparatus 50*a*, except followed by the suffix “c”. It is to be appreciated by a person of skill with the benefit of this description that variations of the apparatus 50*c* may include additional features and components and that other variations may omit one or more of the features. In the present example, the apparatus 50*c* includes an elongated body 55*c* with a grip 75*c*, a connection mechanism 60*c* with a lip 70*c*, a base 65*c*, and a brush attachment 90*c*.

The brush attachment 90*c* is to hold a paint brush 200 when not in use. The manner by which the brush attachment 90*c* holds the paint brush 200 is not particularly limited. In the present example, the brush attachment 90*c* may be a magnet disposed on a top surface of the apparatus 50*c*. Since most paint brushes include a metallic band 210 that is often ferromagnetic material, the brush attachment 90*c* may magnetically couple to the metallic band 210 to hold the paint brush 200 in a substantially horizontal position. It is to be appreciated by a person of skill with the benefit of this description that the position of the paint brush 200 would allow the paint brush 200 to drip into the can if the paint brush 200 is wet. Furthermore, but securing the paint brush 200 above the can, the paint brush 200 is not submerged in the paint if the can was full or substantially full.

Figure 11:
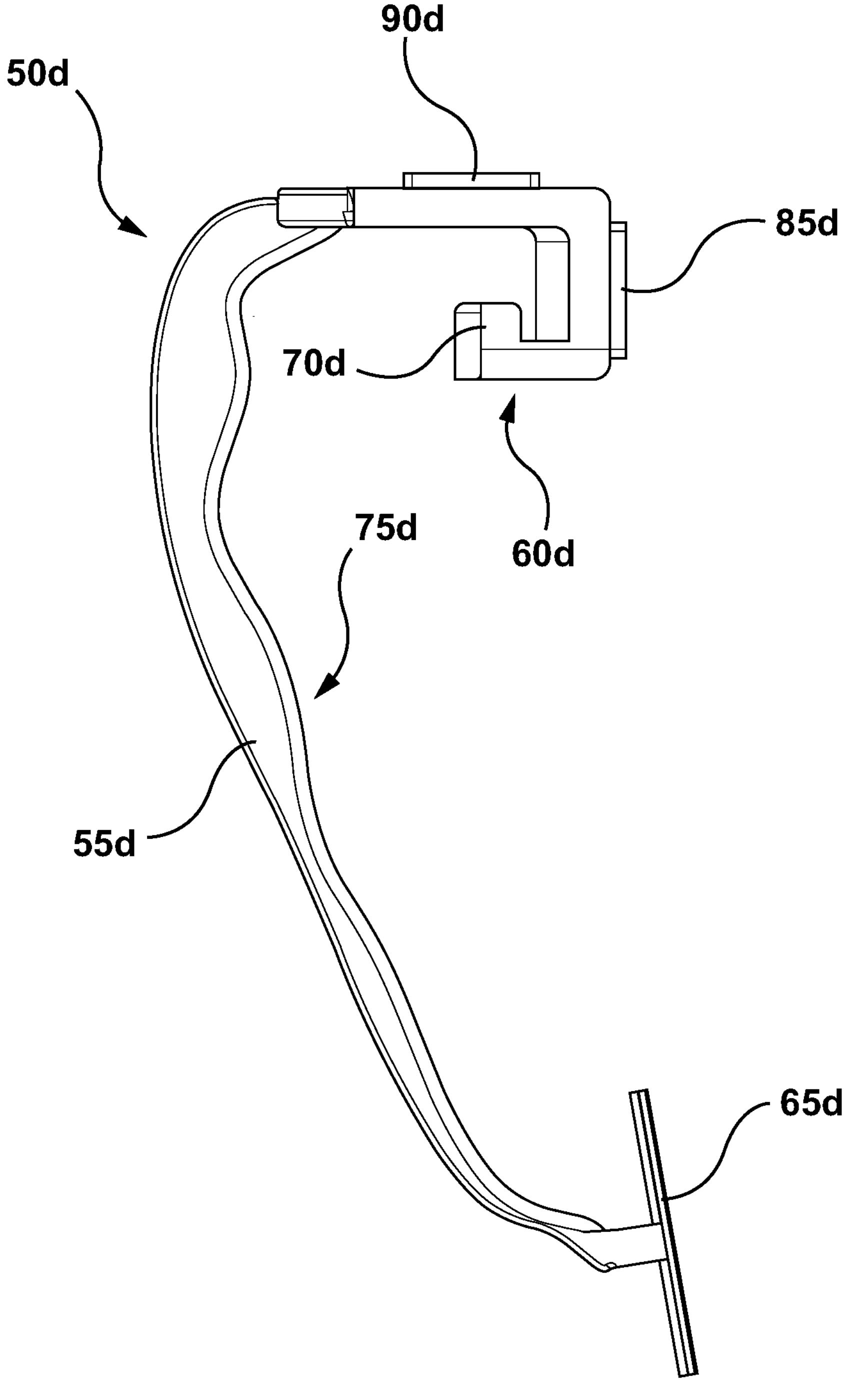
FIG. 11 is a side view of another example of an apparatus with multiple brush attachments to allow a user to support a can.

Referring to FIG. 11, a representation of another apparatus 50*d* to allow a user to support a can are generally shown. Like components of the apparatus 50*d* bear like reference to their counterparts in the apparatus 50*a*, except followed by the suffix “d”. It is to be appreciated by a person of skill with the benefit of this description that variations of the apparatus 50*d* may include additional features and components and that other variations may omit one or more of the features. In the present example, the apparatus 50*d* includes an elongated body 55*d* with a grip 75*d*, a connection mechanism 60*d* with a lip 70*d*, a base 65*d*, a brush attachment 80*d*, and a brush attachment 90*d*.

In the present example, the apparatus 50*d* includes multiple brush attachments 85*d* and 90*d* such that a paint brush may be attached to the apparatus 50 in either position.

Figure 12:
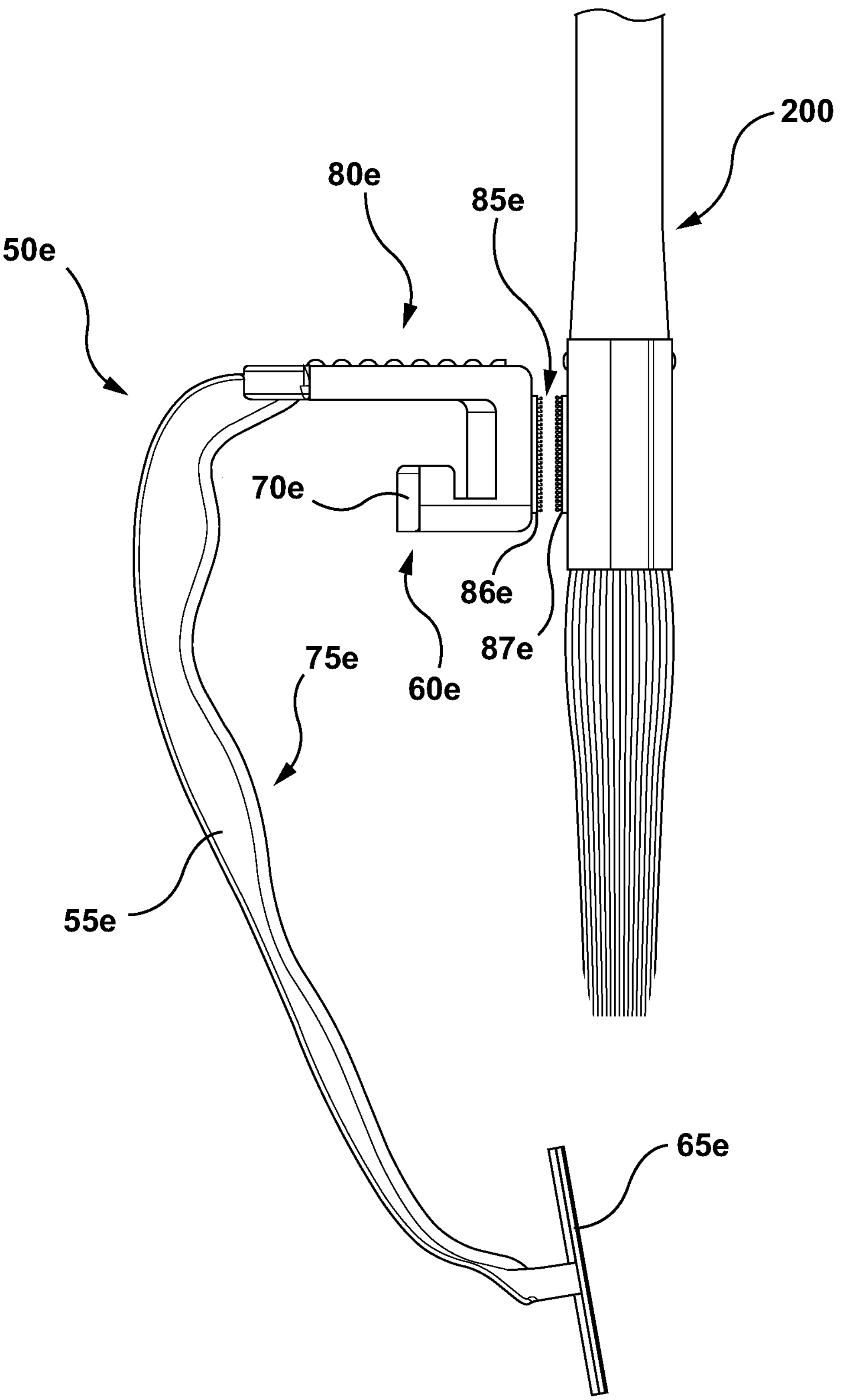
FIG. 12 is a side view of another example of an apparatus with a brush attachment to allow a user to support a can.

Referring to FIG. 12, a representation of another apparatus 50*e* to allow a user to support a can are generally shown. Like components of the apparatus 50*e* bear like reference to their counterparts in the apparatus 50*a*, except followed by the suffix “e”. It is to be appreciated by a person of skill with the benefit of this description that variations of the apparatus 50*e* may include additional features and components and that other variations may omit one or more of the features. In the present example, the apparatus 50*e* includes an elongated body 55*e* with a grip 75*e*, a connection mechanism 60*e* with a lip 70*e*, a base 65*e*, a textured area 80*e*, and a brush attachment 85*e*.

In the present example, the brush attachment 85*e* is to hold a paint brush 200 when not in use. The manner by which the brush attachment 85*e* holds the paint brush 200 involves a fastener. In the present example, the fastener includes a fastening part 86*e* disposed on the connection mechanism 60*e*. The fastening part 86*e* is to couple with a complimentary fastening part 87*e* disposed on the paint brush 200. The fastening mechanism is not particularly limited. For example, the fastening mechanism may include complimentary hook and loop fasteners. In other examples, the fastening mechanism may include clips and other types of mechanical features to hold the paint brush 200 to the apparatus 50*e* while also providing the ability to quickly attach and detach the paint brush 200.

Various advantages will now become apparent to a person of skill in the art. In particular, the apparatus 50 or any of the variations described above may be used by a painter when carrying out brushwork so that the painter can easily carry the can of paint to load the brush during the painting process. The apparatus 50 is designed to be comfortable for the painter holding the can of paint which not obstructing the space above the opening of the can such that the painter can load a brush easily.

It should be recognized that features and aspects of the various examples provided above may be combined into further examples that also fall within the scope of the present disclosure.

What is claimed is:

1. An apparatus configured to be attached to a paint can, the apparatus comprising:

an elongated body to engage with a hand of a user;

a connection mechanism disposed on a first end of the elongated body, wherein the connection mechanism is to engage an underside of a rim of the paint can; and a base disposed on a second end of the elongated body, wherein the base is to apply a force against a side of the paint can, wherein the elongated body is resiliently flexible to apply pressure at the connection mechanism and the base when engaged to the paint can.

2. The apparatus of claim 1, wherein the connection mechanism includes a lip to mate with a trough under the rim of the paint can.

3. The apparatus of claim 2, wherein the lip is curved to match a curvature of the rim of the paint can.

4. The apparatus of claim 1, wherein the elongated body includes a grip to engage with the hand of the user.

5. The apparatus of claim 1, further comprising a textured area proximate to the first end to provide traction for a thumb of the hand.

6. The apparatus of claim 1, further comprising a brush attachment disposed proximate to the first end, wherein the brush attachment is to hold a paint brush.

7. The apparatus of claim 6, wherein the brush attachment is a magnet to couple with a ferromagnetic material of the paint brush.

8. The apparatus of claim 6, wherein the brush attachment is a fastener to couple with a complementary fastener disposed on the paint brush.

9. The apparatus of claim 8, wherein the fastener is a hook and loop fastener.

10. A method of using a paint can while painting, the method comprising:

engaging a rim of the paint can with a connection mechanism disposed on a first end of an elongated body;

applying a force against a side of the paint can with a base via a resilient flexibility of the elongated body, wherein the base disposed at a second end of the elongated body, wherein the connection mechanism and the base secure the elongated body to the paint can; and lifting the paint can by holding the elongated body.

11. The method of claim 10, wherein engaging the rim comprises mating a lip of the connection mechanism with a trough under the rim of the paint can.

12. The method of claim 11, wherein mating the lip comprises applying an upward force to the connection mechanism against the paint can.

13. The method of claim 10, wherein holding the elongated body comprises holding a grip disposed on the elongated body.

14. The method of claim 10, further comprising holding a paint brush with a brush attachment disposed proximate to the first end.

15. The method of claim 14, wherein holding the paint brush comprises magnetically coupling a magnet to a ferromagnetic material of the paint brush.

16. The method of claim 14, wherein holding the paint brush comprises fastening the paint brush to the brush attachment.

17. The method of claim 16, wherein fastening the paint brush comprises fastening the paint brush with a hook and loop fastener.

18. The method of claim 10, further comprising disengaging the connection mechanism from the rim by urging the connection mechanism toward a center of the paint can.

* * * * *